United States Patent
Kassai et al.

(10) Patent No.: US 8,266,403 B2
(45) Date of Patent: Sep. 11, 2012

(54) STORAGE SYSTEM, UNAUTHORIZED ACCESS DETECTION METHOD, AND NON-TRANSITORY COMPUTER-READABLE MEDIUM STORING UNAUTHORIZED ACCESS DETECTION PROGRAM

(75) Inventors: Kunihiko Kassai, Kawasaki (JP); Naoshi Sugimoto, Numazu (JP)

(73) Assignee: Fujitsu Limited, Kawasaki (JP)

( * ) Notice: Subject to any disclaimer, the term of this patent is extended or adjusted under 35 U.S.C. 154(b) by 383 days.

(21) Appl. No.: 12/504,867

(22) Filed: Jul. 17, 2009

(65) Prior Publication Data

US 2010/0037030 A1    Feb. 11, 2010

(30) Foreign Application Priority Data

Aug. 5, 2008 (JP) ................... 2008-201726

(51) Int. Cl.
 *G06F 12/14* (2006.01)
(52) U.S. Cl. ........ 711/163; 710/200; 711/152; 711/161; 711/164
(58) Field of Classification Search .............. 711/152, 711/163, 161, 164; 710/200
See application file for complete search history.

(56) References Cited

U.S. PATENT DOCUMENTS

| | | | |
|---|---|---|---|
| 6,618,795 B2 * | 9/2003 | Chan et al. ............... | 711/162 |
| 7,624,230 B2 * | 11/2009 | Kamei et al. ............. | 711/113 |
| 8,103,881 B2 * | 1/2012 | Doughty et al. .......... | 713/186 |
| 2001/0014929 A1 * | 8/2001 | Taroda et al. ............ | 711/4 |
| 2002/0166034 A1 * | 11/2002 | Koschella ................ | 711/152 |
| 2004/0010467 A1 * | 1/2004 | Hori et al. .............. | 705/50 |
| 2005/0091515 A1 * | 4/2005 | Roddy et al. ............ | 713/188 |
| 2005/0097324 A1 | 5/2005 | Mizuno | |
| 2005/0193182 A1 * | 9/2005 | Anderson et al. ......... | 711/163 |
| 2005/0257048 A1 | 11/2005 | Willman | |
| 2005/0278539 A1 | 12/2005 | Honda et al. | |
| 2006/0020818 A1 | 1/2006 | Mizuno | |

FOREIGN PATENT DOCUMENTS

| | | |
|---|---|---|
| JP | 2005-135124 | 5/2005 |
| JP | 2005-310122 | 11/2005 |
| JP | 2005-352833 | 12/2005 |
| JP | 2006-65488 | 3/2006 |
| JP | 2006-236051 | 9/2006 |
| JP | 2007-188307 | 7/2007 |
| JP | 2006-260176 | 9/2008 |

OTHER PUBLICATIONS

Japanese Office Action mailed Jun. 5, 2012 for corresponding Japanese Application No. 2008-201726, with English-language translation.

* cited by examiner

*Primary Examiner* — Jae Yu
(74) *Attorney, Agent, or Firm* — Fujitsu Patent Center

(57) ABSTRACT

An access instruction portion that sends an access instruction to the storage apparatus in response to being accessed from the terminal; and an access management portion that sends a confirmation notification to the access instruction portion in response to receiving the access instruction, wherein the access instruction portion comprises: an access instruction distinction step of determining whether or not the sender of the access instruction related to that confirmation notification is the access instruction portion; and an unauthorized access instruction detection portion that determines, on the basis of determination result made by the access instruction distinction portion, the access instruction received by the access management portion from a sender other than the access instruction portion as an unauthorized access instruction.

16 Claims, 7 Drawing Sheets

STORAGE SYSTEM, UNAUTHORIZED ACCESS DETECTION METHOD, AND NON-TRANSITORY COMPUTER-READABLE MEDIUM STORING UNAUTHORIZED ACCESS DETECTION PROGRAM

CROSS-REFERENCE TO RELATED APPLICATION

This application is based upon and claims the benefit of priority of the prior Japanese Application No. 2008-201726 filed on Aug. 5, 2008 in Japan, the entire contents of which are hereby incorporated by reference.

FIELD

The embodiment discussed herein is related to a technique using an archive apparatus that manages data stored in a storage apparatus, for example, a technique for detecting unauthorized accesses intended to tamper data stored on the storage apparatus.

BACKGROUND

An archive apparatus (storage apparatus) is well known, for example, which manages content data (e.g., contents, archive file) stored in a storage apparatus and inspects whether content data has been tampered or make reference to by an unauthorized user (hereinafter, such acts are simply referred to as "tampering") in order to ensure the authenticity of data stored on the storage apparatus (for example, see Japanese Laid-open Patent Publications Nos. 2006-260176, 2007-188307, and 2006-065488).

FIG. 7 is a diagram schematically illustrating one example of a technique to detect tampering of content data using a conventional archive apparatus.

For example, a technique is well known which detects tampering of content data using an archive apparatus 90 as depicted in FIG. 7.

The archive apparatus 90 is configured to include a management information storage portion 91, a disk apparatus 92, a tape apparatus 93, and a content management processor 94.

The management information storage portion 91 is adapted to maintain content management information that is generated for each content. Such content management information may include various data items, such as a content ID, information on storage on which content is stored.

The disk apparatus 92 and the tape apparatus 93 are adapted to function as storage apparatuses as described above, and are adapted to store content data generated by a specific operation server 95.

The content management processor 94 is configured to manage content data stored on the disk apparatus 92 and the tape apparatus 93.

More specifically, for example, upon registering (storing) content data generated by the specific operation server 95 into the disk apparatus 92, the content management processor 94 generates a hash code for the content. The content management processor 94 stores the generated hash code by relating it to the content data to be stored on the disk apparatus 92 (see the reference symbol "G1" in FIG. 7).

Thereafter, the content management processor 94 makes comparison every time the specific operation server 95 accesses to content data stored on the disk apparatus 92 (see the reference symbol "G2" in FIG. 7). For example, when the content data that is saved on the disk apparatus 92 has been updated, the content management processor 94 compares the hash code that was generated when the content was registered (saved) against the hash code generated when the content was updated, and determines whether there is any discrepancy between them.

Suppose that content data saved on the disk apparatus 92 is tampered by a terminal (not depicted) other than the specific operation server 95 by making data access to the archive apparatus 90 (see the reference symbol "G3" in FIG. 7), the content management processor 94 generates a hash code that is different from the hash code that was generated upon registration. Thereafter, when the specific operation server 95 accesses to the content data stored on the disk apparatus 92, the content management processor 94 detects that there is discrepancy between the hash code that was generated when the content was registered and the hash code that was generated when the content was tampered (see the reference symbol "G4" in FIG. 7). This makes it possible to check whether or not content data saved on the disk apparatus 92 has been tampered.

However, the above-described technique to detect tampering of content data can detect and identify tampering of content data only after the content data stored on the disk apparatus 92 is accessed by the specific operation server 95, that is, after the content data was tampered.

Since tampering of content data cannot be detected and identified in real-time, notification of tampering and recovery of tampered data are not possible shortly after the tampering was made.

SUMMARY

According to an aspect of the embodiment, an archive apparatus is disclosed which maintains data sent from a terminal via a network into a storage apparatus, the archive apparatus including: an access instruction portion that sends an access instruction to the storage apparatus in response to being accessed from the terminal; and an access management portion that, in response to receiving the access instruction, sends a confirmation notification including sender information related to a sender of the received access instruction to the access instruction portion, wherein the access instruction portion includes: an access instruction distinction portion that determines, on the basis of the confirmation notification sent by the access management portion, whether or not the sender of the access instruction related to that confirmation notification is the access instruction portion; and an unauthorized access instruction detection portion that determines, on the basis of determination result made by the access instruction distinction portion, the access instruction received by the access management portion from a sender other than the access instruction portion as an unauthorized access instruction.

Furthermore, an unauthorized access detection method is disclosed using an archive apparatus that maintains data sent from a terminal via a network into a storage apparatus, the method including: an access instruction step of sending an access instruction to the storage apparatus in response an access instruction portion of the archive apparatus being accessed by the terminal; an access instruction confirmation step of sending, in response to receiving the access instruction, a confirmation notification including sender information relating to a sender of the received access instruction; an access instruction distinction step of determines, on the basis of the confirmation notification sent in the access instruction confirmation step, whether or not the sender of the access instruction related to that confirmation notification is the access instruction portion; and an unauthorized access instruction detection step of determining, on the basis of determination result made in the access instruction distinction step, the access instruction received from a sender other than the access instruction portion as an unauthorized access instruction.

Furthermore, an unauthorized access detection program is disclosed which, when executed on an archive apparatus that maintains data sent from a terminal via a network into a storage apparatus, makes the archive apparatus to execute: an access instruction step of sending an access instruction to the storage apparatus in response an access instruction portion of the archive apparatus being accessed by the terminal; an access instruction confirmation step of sending, in response to receiving the access instruction, a confirmation notification including sender information relating to a sender of the received access instruction; an access instruction distinction step of determines, on the basis of the confirmation notification sent in the access instruction confirmation step, whether or not the sender of the access instruction related to that confirmation notification is the access instruction portion; and an unauthorized access instruction detection step of determining, on the basis of determination result made in the access instruction distinction step, the access instruction received from a sender other than the access instruction portion as an unauthorized access instruction.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Hereinafter, embodiments now will be described with reference to the drawings.

Figure 1:
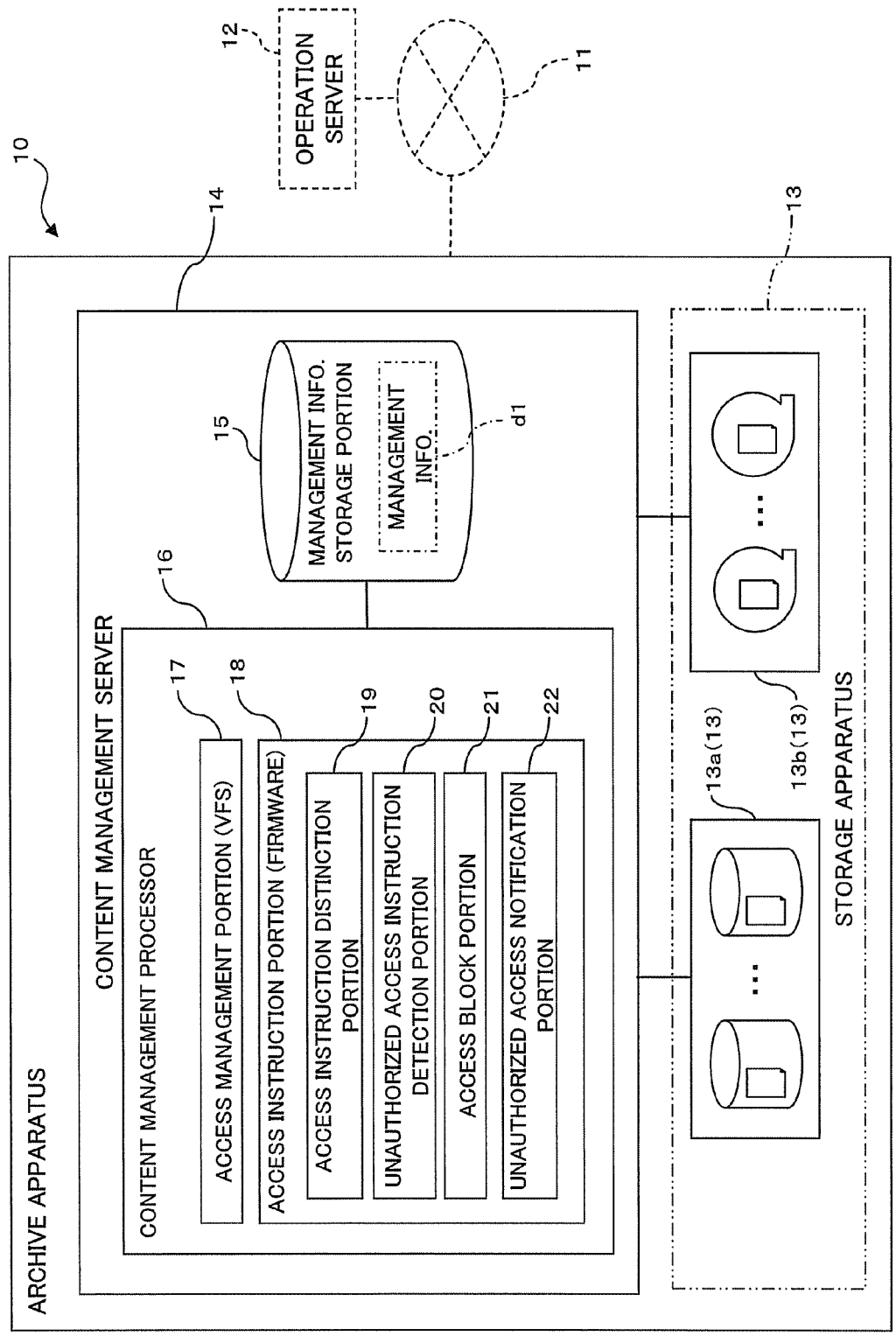
FIG. 1 is a diagram schematically illustrating an example of the configuration of an archive apparatus as one embodiment.

FIG. 1 is a diagram schematically illustrating an example of the configuration of an archive apparatus 10 as one embodiment.

As depicted in FIG. 1, the archive apparatus (storage apparatus) 10 according to this embodiment is adapted to store content data (e.g., content files, data, archive files) transmitted from an operation server (terminal) 12 that is connected to the archive apparatus 10 via a network 11 into a storage apparatus 13, which will be described later, and to manage the content data stored on the storage apparatus 13. That is, the archive apparatus 10 is adapted to store the content data transmitted from the operation server 12 that is connected via the network 11 on the storage apparatus 13 and manages the data.

The archive apparatus 10 is configured in a Write Once Read Many (WORM) configuration in which data is cannot be changed once it is written. The operation server 12 is permitted to access the archive apparatus 10 (access instruction portion 18 that will be described later) to resister the content data stored on the storage apparatus 13 only when the operation server 12 access to the archive apparatus 10 using an Application Program Interface (API) provided by the archive apparatus 10. In other words, the archive apparatus 10 only permits accesses that are made using the API provided by the archive apparatus 10. Note that since detailed description of apparatuses and operation servers constructed by means of the WORM structure will be omitted since they are well known in the art.

Any accesses to content data stored on the storage apparatus 13 are made on a content basis (on a file basis). That is, accesses to content data are made on a content basis.

The archive apparatus 10 is configured to include, for example, the storage apparatus 13 and content management server 14 as depicted in FIG. 1.

The storage apparatus 13 is adapted to store content data generated at the operation server 12, together with the hash code thereof, and is configured to include, for example, a disk array apparatus 13a and a tape library apparatus 13b. Note that detailed description of the disk array apparatus 13a and the tape library apparatus 13b will be omitted since they are well known in the art.

The content management server 14 is configured to include a management information storage portion 15 and a content management processor 16.

The management information storage portion 15 is adapted to maintain management information d1 and is embodied by a hard disk drive (HDD), for example.

The management information d1 is information for managing accesses to the content management processor 16, and includes information by means of which a login ID or an accessing IP address can be extracted, for example.

The management information d1 is configured to include, for example, content management information, an access log, and an IP filter (management table).

The content management information is information generated for each content, and includes data items, such as a content ID, information on storage on which content is stored.

The access log is a record on accesses that are made to the content management processor 16 (operation log).

The IP filter is the record (store) of IP addresses of terminals that have been made unauthorized accesses to the content management processor 16 as unauthorized IP addresses (unauthorized access originators) in order to block any accesses from the unauthorized access terminals. Here, the term "unauthorized access terminal" refers to the origin of the access (sender) of an unauthorized access instruction to the content management processor 16 (unauthorized access; hereinafter, referred to as "unauthorized access instruction"), and is a terminal (not depicted) other than the operation server 12, for example.

The content management processor 16 is adapted to function as an access management portion 17 and an access instruction portion (content management system) 18.

The access management portion 17 is adapted to function as a file system, i.e., virtual file system (VFS) that executes various data control processing on content data stored on the storage apparatus 13 on the basis of various access instructions (hereinafter, referred to as access instructions) to the storage apparatus 13 sent from the access instruction portion 18 that will be described later. Here, the term "various data control processing" refers to, for example, content data open processing, content data write processing, internal open processing, and internal write processing, and notification processing to the access instruction portion 18 that will be described later of completion of such processing after the processing is completed. In addition, such data control processing further includes, for example, tape related processing other than the above-described processing. Here, "tape related processing" refers to processing for duplicating unaffected content data stored on the disk array apparatus 13*a* and storing the duplicate on the tape library apparatus 13*b* (data duplication).

Note that detailed description of various data control processing in the VFS will be omitted since they are well known in the art.

In addition, the access management portion 17 is adapted to send a confirmation notification (modification notification) to the access instruction portion 18 that will be described later in response to receiving an open instruction for content data as an access instruction from the access instruction portion 18 or other terminals (not depicted). Here, confirmation notification includes information on the origin (sender) of an access instruction received at the access management portion 17, and includes, for example, the process ID (sender information) of the origin of the access, and the file name of the content data to be accessed. Accordingly, the access management portion 17 inquires of an access instruction distinction portion 19 about whether the process ID or the file name of the origin of the access to content data is authorized, that is, whether or not the origin of the access is authentic.

The access management portion 17 is adapted to initiate write processing of the content data stored on the storage portion 13 upon receiving a confirmation result (determination result) indicating that the origin of the access is authentic from the access instruction portion 18. Otherwise, the access management portion 17 is adapted to prohibit write processing on the content data stored on the storage portion 13 upon receiving a confirmation result indicating that the origin of the access is not authentic from the access instruction portion 18. That is, the access management portion 17 executes write processing on content data stored on the storage portion 13 only after it receives a confirmation result indicating that the origin of the access is authentic from the access instruction portion 18.

The access instruction portion 18 is adapted to function as a content management program (firmware, firmware component) that sends the access management portion 17 an access instruction related to the access request from the operation server 12 when it is accessed by the operation server 12, for example. Here, access instructions include, for example, open instructions for content data or write instructions for content data. The access instruction portion 18 is adapted to assign a self-identification ID (identification) to an open instruction when sending the open instruction, and send it to the access management portion 17 together with that open instruction.

Furthermore, the access instruction portion 18 is configured to include the access instruction distinction portion 19, an unauthorized access instruction detection portion 20, an access block portion 21, and an unauthorized access notification portion 22.

The access instruction distinction portion 19 is adapted to check the origin of the access to the access management portion 17 based on the confirmation notification received from the access management portion 17, and determine whether the origin of the access instruction corresponding to that confirmation notification is the access instruction portion 18. In this embodiment, the access instruction distinction portion 19 determines that the origin of the access is authentic (that is, access from the authorized API) if the origin of the access is the access instruction portion 18. Otherwise, the access instruction distinction portion 19 determines that the origin of the access is not authentic (that is, access from other than the authorized API) if the origin of the access is not the access instruction portion 18.

More specifically, for example, the access instruction distinction portion 19 determines that the origin of the access is authentic if the process ID contained in confirmation notification received from the access management portion 17 coincides with the self-identification ID that was assigned to the access instruction by the access instruction portion 18. On the other hand, the access instruction distinction portion 19 determines that the origin of the access is not authentic if the process ID does not coincide with the self-identification ID. That is, the access instruction distinction portion 19 determines that any access to the access management portion 17 originated from any source other than the access instruction portion 18 is an unauthorized operation (that is, the origin of the access is not authentic).

The access instruction distinction portion 19 is then adapted to notify the access management portion 17 of whether or not the origin of the access is authentic as a confirmation result.

The unauthorized access instruction detection portion 20 is adapted to detect (sense) unauthorized access instructions based on determination results made by the access instruction distinction portion 19. Here, unauthorized access instructions refer to any access instructions received by the access management portion 17 from origins other than the access instruction portion 18.

Accordingly, the access instruction portion 18 cooperates with the access management portion 17 that functions as a file system (VFS) to monitor a unauthorized modification (or deletion) of content data immediately on a block basis. That is, the access instruction portion 18 detects an unauthorized modification operation (or delete operation) to an area (for example, the disk array apparatus 13*a*) that has been stored as content data based on the management information d1.

The access block portion 21 is adapted to, when an unauthorized access instruction is detected by the unauthorized access instruction detection portion 20, block accesses from the unauthorized access terminal that made the unauthorized access.

More specifically, when the unauthorized access instruction detection portion 20 detects an unauthorized access instruction, the access block portion 21 extracts the process ID of the origin of the access, the login ID, and the accessing IP address from the management information d1 by analyzing the access log. The access block portion 21 records the extracted accessing IP address into the IP filter as an unauthorized IP address. That is, the access block portion 21 is adapted to update the IP filter when the unauthorized access instruction detection portion 20 detects the unauthorized access instruction. Thereby, once the accessing IP address of the unauthorized access terminal is registered to the IP filter, any access from that terminal to the content management processor 16 is blocked (unauthorized IP blocking).

Accordingly, at the time when the access instruction distinction portion 19 determines that an access to content data stored on the storage apparatus 13 is an unauthorized operation, the origin of the access is inspected and the access block portion 21 blocks only operation from that unauthorized access terminal without suspending the operations.

The unauthorized access notification portion 22 is adapted to inform that the unauthorized access instruction has been detected by executing mail transmission processing to the predetermined (specific) notification party when the unauthorized access instruction detection portion 20 detects the unauthorized access instruction. Here, the "predetermined notification party" refers to a predetermined administrator, management terminal, or the like, and is the operation server 12 having the API provided by the archive apparatus 10 in this embodiment.

Accordingly, the unauthorized access notification portion 22 notifies an unauthorized operation of the operation server 12 when it determines that the access is not made by the access instruction portion 18.

Figure 2:
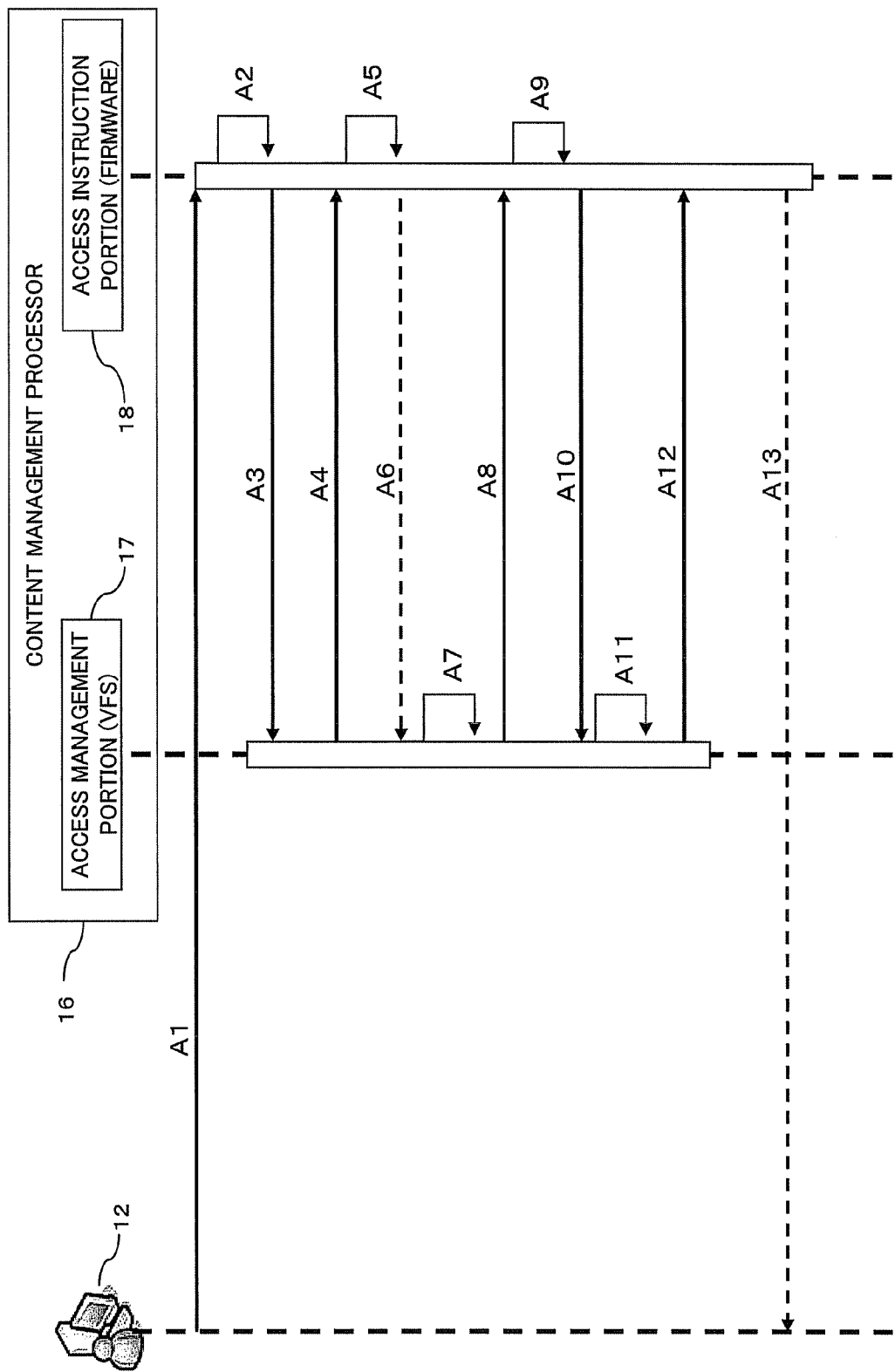
FIG. 2 is a diagram illustrating a specific example of correct registration processing on content data in the archive apparatus as one embodiment.

FIG. 2 is a diagram illustrating a specific example of correct registration processing on content data in the archive apparatus 10 as one embodiment.

Hereinafter, a specific example of correct registration processing on content data in the archive apparatus 10 according to one embodiment of the present invention now will be described with reference to FIG. 2.

Firstly, the operation server 12 accesses to the access instruction portion 18 using the API provided by the archive apparatus 10 in order to resister content data stored on the storage apparatus 13 (see the reference symbol "A1" in FIG. 2).

The access instruction portion 18 sends an open instruction (access instruction) of the content data stored on the storage portion 13 to the access management portion 17 together with the self-identification ID assigned to that instruction (see the reference symbol "A2" in FIG. 2; access instruction step). That is, the operation server 12 sends the access instruction related to the content data stored on the storage portion 13 to the access management portion 17 via the access instruction portion 18.

The access management portion 17 executes open processing on the content data stored on the storage portion 13 in response to the open instruction sent from the access instruction portion 18 (see the reference symbol "A3" depicted in FIG. 2). The access management portion 17 then inquiries of the access instruction distinction portion 19 whether the origin of the access is authentic or not by sending a confirmation notification including the self-identification ID to the access instruction portion 18 (see the reference symbol "A4" in FIG. 2; access instruction confirmation step).

The access instruction distinction portion 19 verifies the origin of the access based on the confirmation notification sent from the access management portion 17 (see the reference symbol "A5" depicted in FIG. 2). The access instruction distinction portion 19 determines that the origin of the access is authentic as the self-identification ID included in the confirmation notification coincides with self-identification ID that was assigned when the open instruction was sent, and notifies the result of the access management portion 17 as a confirmation result (see the reference symbol "A6" in FIG. 2; access instruction distinction step).

The access management portion 17, upon receiving the confirmation result that the origin of the access is authentic, executes internal open processing (see the reference symbol "A7" in FIG. 2), and notifies open completion of the access instruction portion 18 upon completion of the internal open processing (see the reference symbol "A8" in FIG. 2).

The access instruction portion 18 sends a write instruction for the content data to the access management portion 17 in response to receiving the open completion notification from the access management portion 17 (see the reference symbol "A9" in FIG. 2).

The access management portion 17 executes content data write processing when it receives a write instruction from the access instruction portion 18 for the content data (see the reference symbol "A10" in FIG. 2), and executes internal write processing (see the reference symbol "A11" in FIG. 2). When the write processing and the internal write processing complete, the access management portion 17 notifies the access instruction portion 18 of write completion (see the reference symbol "A12" in FIG. 2), and the registration of the content data is successfully completed (see the reference symbol "A13" in FIG. 2).

Figure 3:
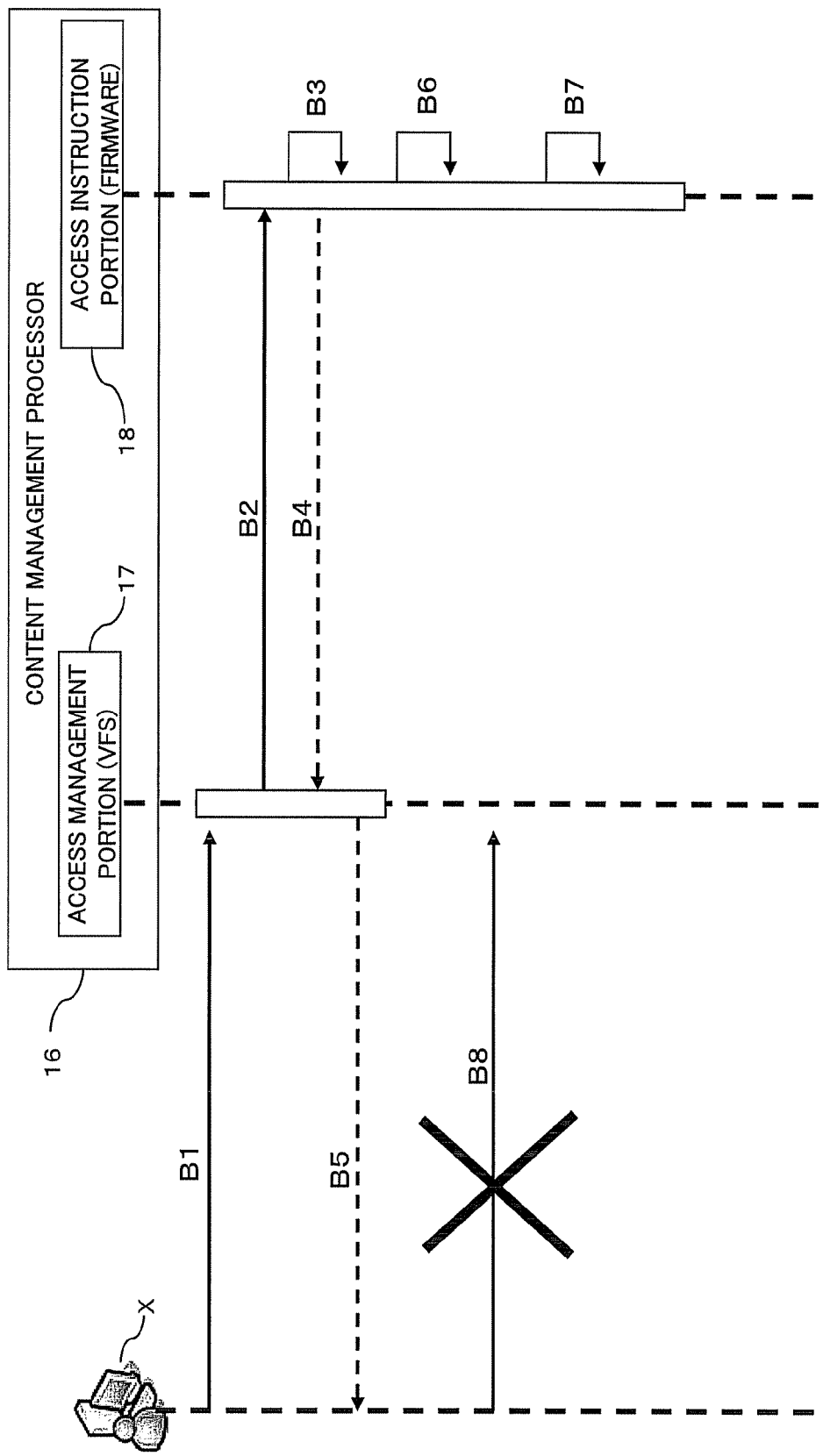
FIG. 3 is a diagram illustrating a specific example of unauthorized registration processing on content data in the archive apparatus as one embodiment.

FIG. 3 is a diagram illustrating a specific example of unauthorized registration processing on content data in the archive apparatus 10 as one embodiment.

Hereinafter, a specific example of unauthorized registration processing on content data in the archive apparatus 10 according to one embodiment of the present invention now will be described with reference to FIG. 3.

First, assume that a terminal X other than the operation server 12 accesses the access management portion 17 without using the API provided by the archive apparatus 10 to attempt to tamper or make unauthorized reference to (hereinafter, simply referred to as "tamper") content data stored on the storage apparatus 13 (see the reference symbol "B1" in FIG. 3). That is, the terminal X directly sends an access instruction related to the content data stored on the storage portion 13 to the access management portion 17.

The access management portion 17 then inquiries of the access instruction distinction portion 19 whether the origin of the access is authentic or not by sending a confirmation notification including the process ID of the terminal X to the access instruction portion 18 (see the reference symbol "B2" in FIG. 3; access instruction confirmation step).

The access instruction distinction portion 19 verifies the origin of the access based on the confirmation notification sent from the access management portion 17 (see the reference symbol "B3" depicted in FIG. 3). The access instruction distinction portion 19 determines that the origin of the access is not authentic as the process ID of the terminal X does not coincide with the self-identification ID contained in the confirmation notification which was provided when the open instruction was sent (access instruction distinction step). In addition, the access instruction distinction portion 19 notifies the access management portion 17 of the notification that the origin of the access is not authentic (see the reference symbol "B4" in FIG. 3). The unauthorized access instruction detection portion 20 then detects that the access instruction is an unauthorized access instruction (unauthorized access instruction detection step).

When the access management portion 17 receives the notification that the origin of the access is not authentic, it denies the access instruction for the content data (see the reference symbol "B5" in FIG. 3).

When the unauthorized access instruction detection portion 20 detects the unauthorized access instruction, the access block portion 21 blocks the access from the unauthorized accessing terminal X that is the origin of the access (see the reference symbol "B6" in FIG. 3; access block step). Note that the access block technique will be described in detail later.

Upon the unauthorized access instruction detection portion 20 detects the unauthorized access instruction, the unauthorized access notification portion 22 notifies the operation server 12 (administrator) of that the unauthorized access instruction was detected by sending a mail (see the reference symbol "B7" in FIG. 3; unauthorized access notification step).

Thereby, any accesses to the access management portion 17 from the terminal X will be blocked, and any login attempts to the access management portion 17 through the IP address corresponding to the terminal X will fail (see the reference symbol "B8" in FIG. 3).

Figure 4:
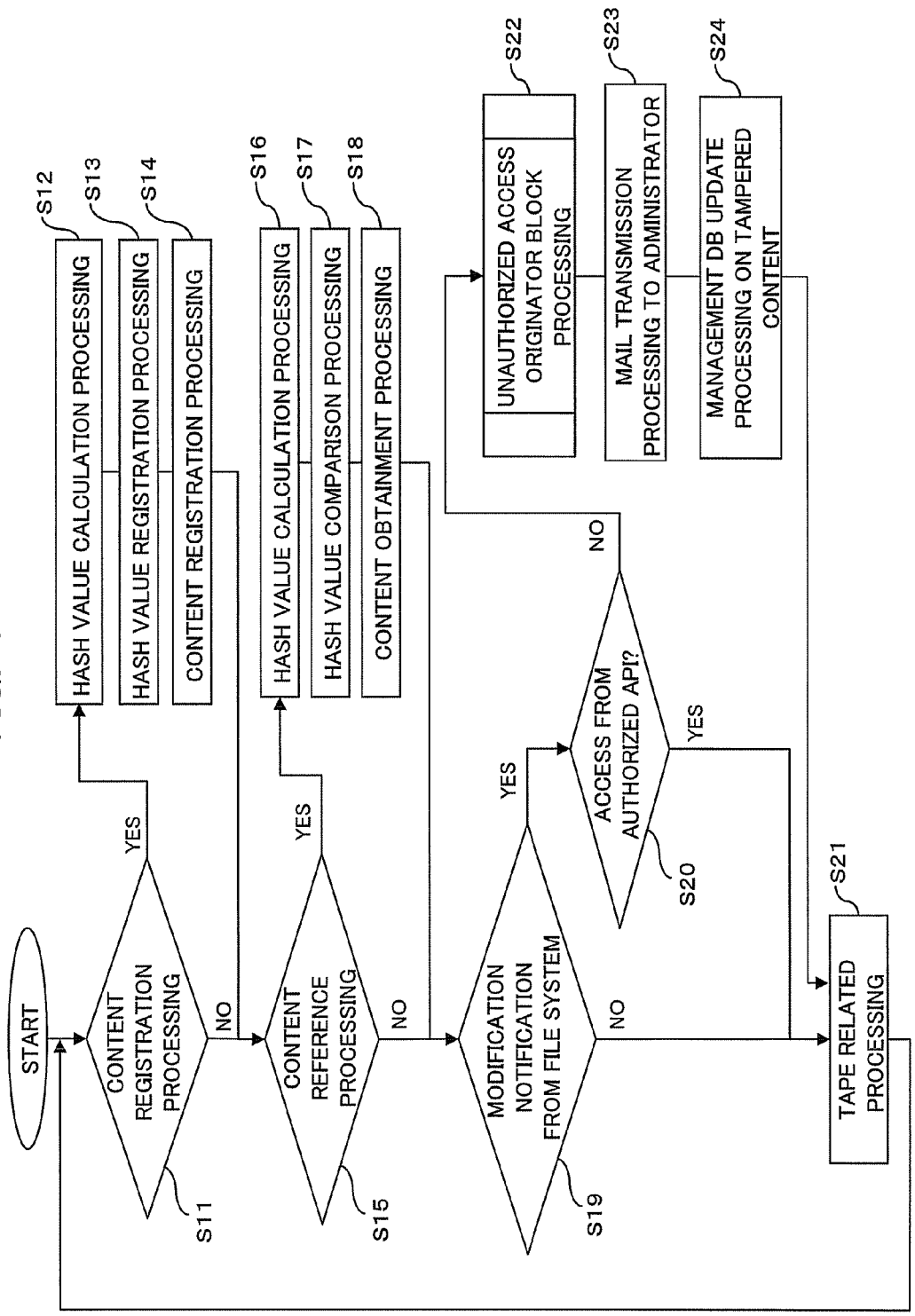
FIG. 4 is a flowchart illustrating one example of the operational procedure of the archive apparatus according to one embodiment.

One example of the operational procedure of the archive apparatus 10 constructed as above according to one embodiment now will be described with reference to the flowchart depicted in FIG. 4 (steps S11-S24).

The access instruction portion 18 determines whether or not content data registration processing is to be executed (step S11).

When content data registration processing is to be executed, the access instruction portion 18 executes hash value calculation processing corresponding to that registration processing (see the "YES" route from step S11) (step S12). After executing the hash value registration processing, the access instruction portion 18 executes hash value calculation processing (step S13), and then executes content data registration processing (step S14).

On the other hand, when the content data registration processing is not to be executed (see the "NO" route form step S11), the flow proceeds to step S15.

The access instruction portion 18 determines whether or not content data reference processing is to be executed (step S15).

When content data reference processing is to be executed, the access instruction portion 18 executes hash value calculation processing corresponding to that registration processing (see the "YES" route from step S15) (step S16). After executing the hash value calculation processing, the access instruction portion 18 executes comparison processing between the calculated hash value and the hash value corresponding to the registration processing (step S17), and executes obtainment processing for the content data (step S18).

On the other hand, when the content data reference processing is not to be executed (see the "NO" route form step S15), the flow proceeds to step S19.

The access instruction distinction portion 19 determines whether or not a confirmation notification has been received from the access management portion (file system) 17 (step S19).

Upon receiving a confirmation notification from the access management portion 17 (see the "YES" route from step S19), the access instruction distinction portion 19 checks whether or not the access was made from an authorized API (step S20; access instruction distinction step).

When the access instruction distinction portion 19 confirms that the access was from an authorized API (see the "YES" route from step S20), the access management portion 17 executes tape related processing (step S21).

Otherwise, when the access instruction distinction portion 19 confirms that it is not from an access from an authorized API (see "NO" route from step S20), the access block portion 21 executes unauthorized access origin block processing (step S22; access block step), as well as the unauthorized access notification portion 22 executing notification processing to notify the administrator of the unauthorized access (step S23; unauthorized access notification step). Various preferred methods may be used for the notification, such as sending an electronic mail to the administrator, beeping an alarm, or the like.

The access instruction portion 18 then executes management DB update processing for the tampered content (step S24), and the flow proceeds to step S21. Here, the management DB update processing for the tampered content is processing for identifying the tampered content data as a record (trail).

On the other hand, when the access instruction distinction portion 19 does not receive a confirmation notification from the access management portion 17 (see the "NO" route from step S19), the flow proceeds to step S21.

After the access management portion 17 executes the tape related processing, the flow returns to step S11.

Figure 5:
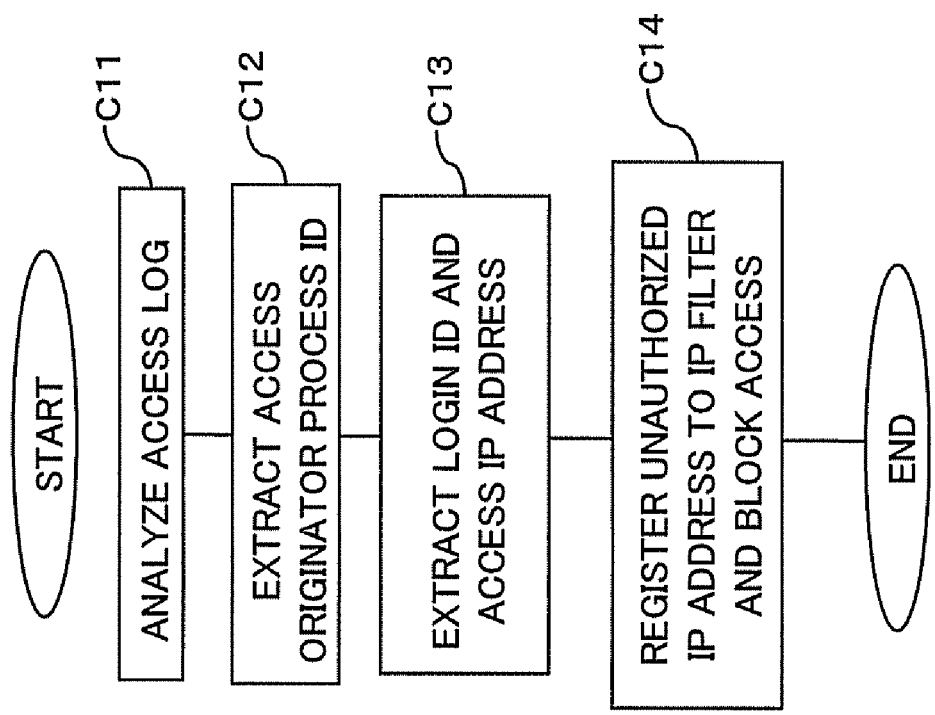
FIG. 5 is a flowchart illustrating one example of an access block technique of the archive apparatus according to one embodiment.

Next, one example of the access block technique in the archive apparatus 10 constructed as above according to one embodiment now will be described with reference to the flowchart depicted in FIG. 5 (steps C11-C14).

When the unauthorized access instruction detection portion 20 detects an unauthorized access instruction, the access block portion 21 analyzes the access log stored on the management information storage portion 15 (step C11).

The access block portion 21 then extracts the process ID of the origin of the access from the management information d1 stored on the management information storage portion 15 (step C12). In addition, the access block portion 21 extracts the login ID and the accessing IP address corresponding to the access origin process ID from the management information d1 stored on the management information storage portion 15 (step C13).

The access block portion 21 blocks accesses from the unauthorized access terminal by registering the extracted accessing IP address as an unauthorized IP address in the IP filter (management table update step) (step C14), and the processing completes.

Figure 6:
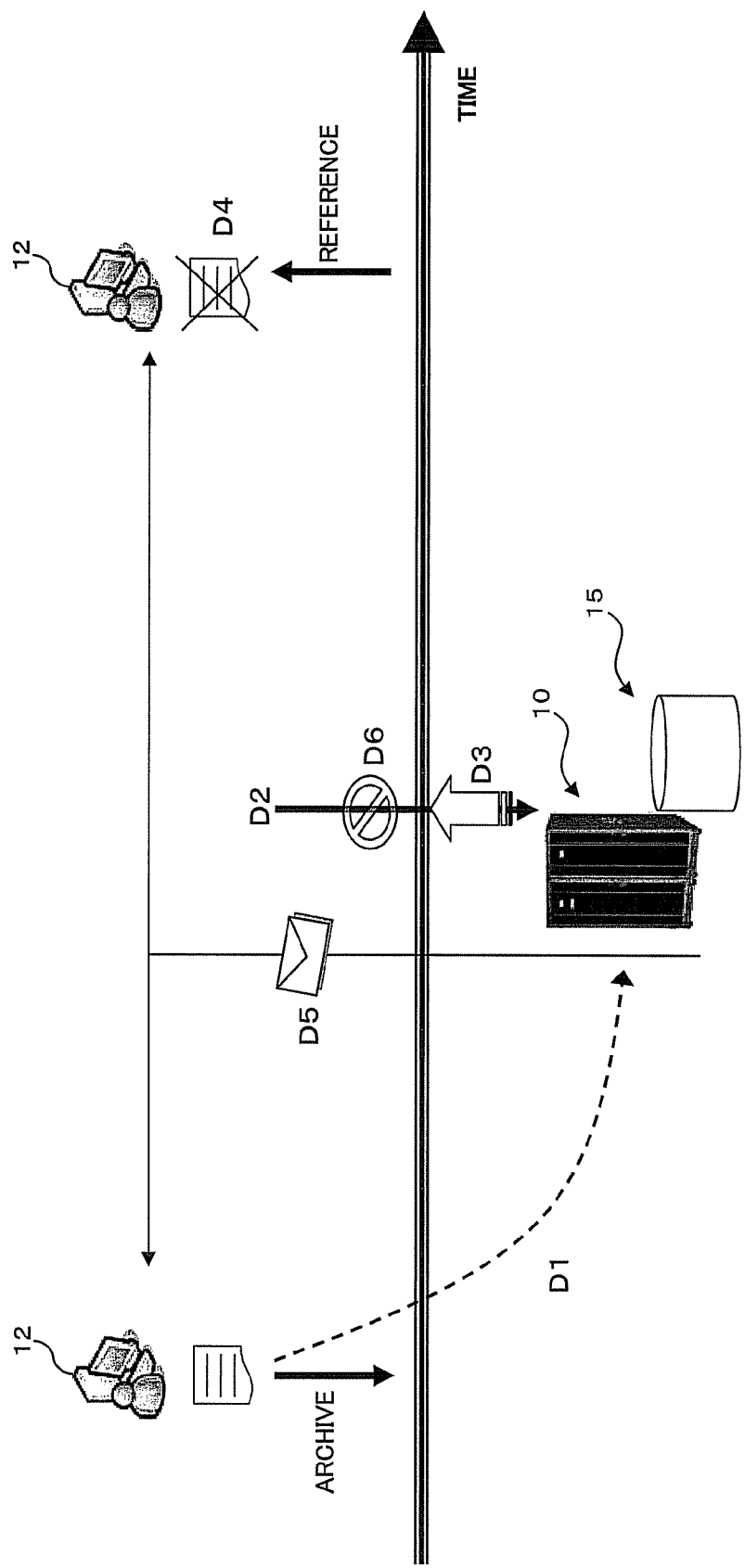
FIG. 6 is a diagram schematically illustrating an example of the configuration of a management table stored in a management information storage portion in an RAID apparatus as one embodiment.
Figure 7:
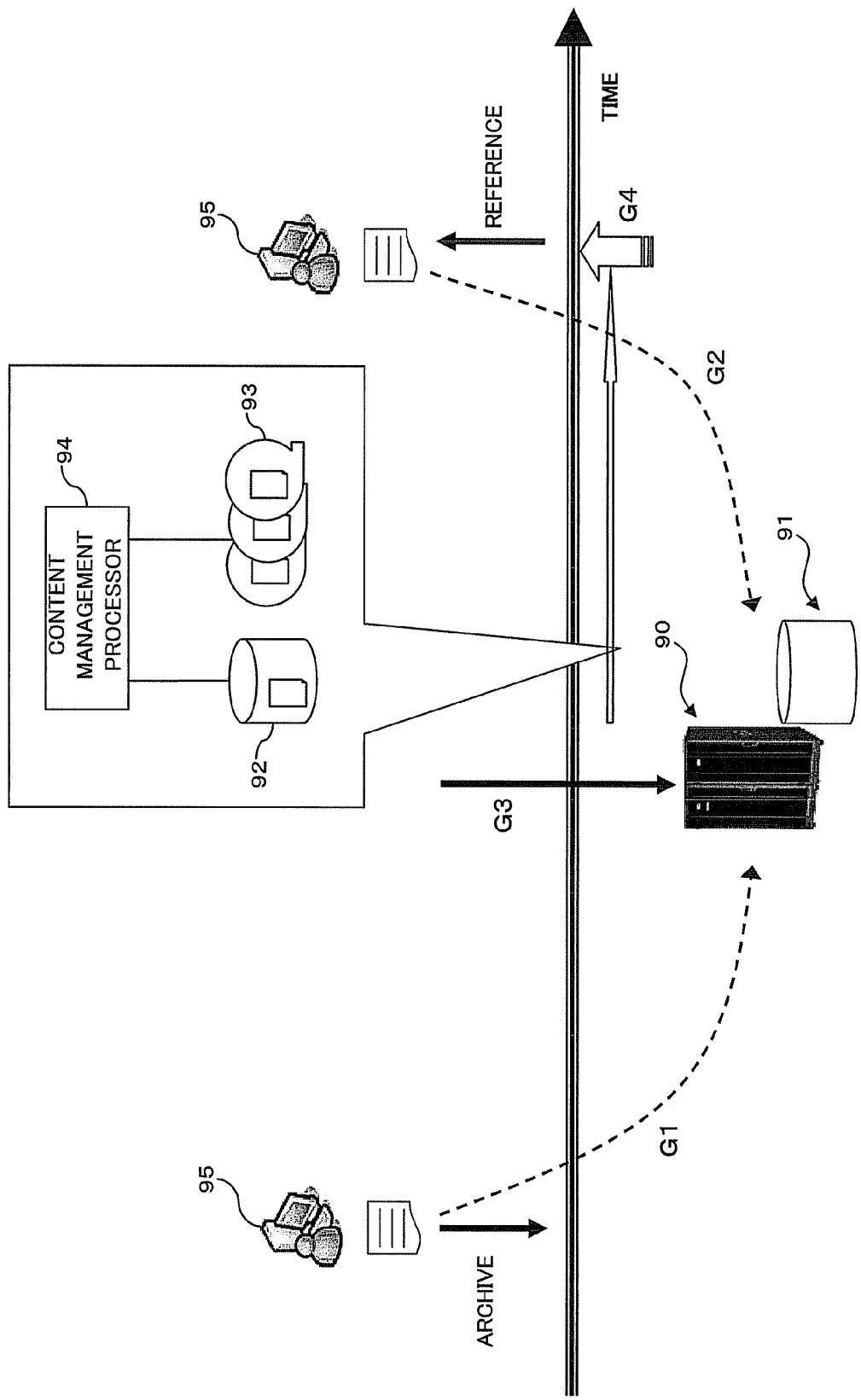
FIG. 7 is a diagram schematically illustrating one example of a technique to detect tampering of content data using a conventional archive apparatus.

FIG. 6 is a diagram schematically illustrating one example of a technique to detect tampering of content data using the archive apparatus 10 as one embodiment.

Hereinafter, the advantageous effects of the archive apparatus 10 as one embodiment of the present invention now will be described with reference to FIG. 6.

As indicated in FIG. 6, when the operation server 12 sends content data using an API, the archive apparatus 10 generates a hash code and stores the received content data and the generated hash code into the storage apparatus 13 (see the reference symbol "D1" in FIG. 6). A terminal (not depicted) other than the operation server 12 intends to tamper the content data and accesses the archive apparatus 10 without using the API (see the reference symbol "D2" in FIG. 6). In response, the archive apparatus 10 detects an open instruction that is not from the access instruction portion 18 (unauthorized accesses) at the timing when content data is attempted to be tampered (that is, at the same time of tampering operation or unauthorized reference operation) (see the reference symbol "D3" in FIG. 6). Thereby, an access monitor function in combination with the access management portion 17 as a file system will be realized wherein unauthorized accesses are quickly detected, rather than detecting them after content data is tampered and then the content data is made reference to by the operation server 12 (see the reference symbol "D4" in FIG. 6). The unauthorized access notification portion 22 immediately notifies the application executed on the operation server 12 of the unauthorized operation (see the reference symbol "D5" in FIG. 6). At the same time, the access block portion 21 inspects the management information d1 stored on the management information storage portion 15 and blocks accesses from the corresponding unauthorized access terminal to the content management processor 16 (see the reference symbol "D6" in FIG. 6).

As described previously, according to the archive apparatus 10 as one embodiment, the archive apparatus 10 having a mechanism that permits content data to be updated only by means of the access instruction portion 18 by detecting open instructions that are not from the access instruction portion 18 at the timing when content data is attempted to be tampered. Thereby, damage to content data can be minimized since a unauthorized access can be detected without waiting until the content data is made reference to by the operation server 12 after the content data is tampered. In addition, any attacks by viruses (vulnerabilities) which may attempt to make reference to or update content data can be prevented proactively. Furthermore, the access log of the unauthorized operation can be inspected (or saved) soon after the unauthorized access was made, which allows making use of the log to find the culprit.

No that the present invention is not limited to the embodiment described above, and various modifications may be made without departing from the spirit of the present invention.

For example, in the above-described embodiment, the access instruction distinction portion 19 determines whether or not the origin of the access is authentic by comparing the process ID contained in confirmation notification received from the access management portion 17 with the self-identification ID that was assigned to the access instruction by the access instruction portion 18. This is not limiting, however, and various techniques may be used so that the access instruction distinction portion 19 is able to determine whether or the origin of the access is authentic by determining whether or not the processing is executed on the content management processor 16 by means of an authorized API process. In such a case, for example, the access instruction distinction portion 19 determines that the origin of the access is authentic when the processing is executed on the content management processor 16 by means of an authorized API process. On the other hand, the access instruction distinction portion 19 determines that the origin of the access is not authentic when the processing is executed on the content management processor 16 without using the authorized API process.

In addition, in the above embodiment, the access block portion 21 blocks operations on the content management processor 16 from an unauthorized access terminal by registering the unauthorized IP address to the IP filter. This is not limiting, however, and the access block portion 21 may block write processing on content data stored on the storage apparatus 13, or the network may be blocked, for example.

In this case, the content management processor 16 may be adapted to function as the access management portion 17 and the access instruction portion 18 (the access instruction distinction portion 19, the unauthorized access instruction detection portion 20, the access block portion 21, and the unauthorized access notification portion 22) by executing the unauthorized access detection program.

Note that the unauthorized access detection program for implementing the functions as the access management portion 17 and the access instruction portion 18 (the access instruction distinction portion 19, the unauthorized access instruction detection portion 20, the access block portion 21, and the unauthorized access notification portion 22) is provided in the form of a program recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD, a Blue-ray disk), a magnetic disk, an optical disk, a magneto-optical disk, a semiconductor storage device, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, a semiconductor storage device, or the like, and the program may be provided from to the storage device to the computer through a communication path.

In order to implement the functions of the access management portion 17 and the access instruction portion 18 (the access instruction distinction portion 19, the unauthorized access instruction detection portion 20, the access block portion 21, and the unauthorized access notification portion 22), a program stored on the internal storage apparatus is executed by at least one microprocessor of the computer. In this case, the computer may alternatively read a program stored in the storage medium for executing it.

Note that, in this embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the content management server 14 includes a function as a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. A storage system that manages an access from a terminal via a network to a storage apparatus, the storage system comprising:

an access instruction portion that sends an access instruction to the storage apparatus in response to being accessed from the terminal; and an access management portion that, in response to receiving the access instruction, sends a confirmation notification including sender information related to a sender of the received access instruction to the access instruction portion, wherein the access instruction portion comprises: an access instruction distinction portion that determines, on the basis of the confirmation notification sent by the access management portion, whether or not the sender of the access instruction related to that confirmation notification is the access instruction portion; and an unauthorized access instruction detection portion that determines, on the basis of determination result made by the access instruction distinction portion, the access instruction received by the access management portion from a sender other than the access instruction portion as an unauthorized access instruction, wherein the access instruction distinction portion determines that the sender of the access instruction related to a confirmation notification is the access instruction portion when the sender information included in the confirmation notification sent from the access management portion coincides with an identification provided by the access instruction portion for its own access instruction.

2. The storage system according to claim 1, further comprising: an access block portion that blocks an access from an unauthorized access terminal that is the sender of the unauthorized access instruction when the unauthorized access instruction is detected by the unauthorized access instruction detection portion.

3. The storage system according to claim 1, further comprising: an unauthorized access notification portion that notifies a predetermined notification party of the detection of the unauthorized access instruction when the unauthorized access instruction is detected by the unauthorized access instruction detection portion.

4. The storage system according to claim 1, further comprising: a management table that includes information related to an unauthorized access terminal that is a sender of an unauthorized access instruction as an unauthorized access originator when the unauthorized access instruction is detected by the unauthorized access instruction detection portion.

5. The storage system according to claim 1, wherein the data is accessed on a file basis.

6. An unauthorized access detection method using a storage system that manages an access from a terminal via a network to a storage apparatus, the method comprising:
sending an access instruction to the storage apparatus in response to the storage system being accessed by the terminal;
sending, in response to receiving the access instruction, a confirmation notification including sender information relating to a sender of the received access instruction;
determining, on the basis of the confirmation notification, whether or not the sender of the access instruction related to that confirmation notification is a processor of the storage system; and determining, on the basis of determination result, the access instruction received from a sender other than the processor as an unauthorized access instruction, wherein the determining whether or not the sender of the access instruction related to that confirmation notification is the processor comprises determining that the sender of the access instruction related to a confirmation notification is the processor when the sender information included in the confirmation notification coincides with an identification provided by the processor for its own access instruction.

7. The unauthorized access detection method according to claim 6, further comprising blocking an access from an unauthorized access terminal that is the sender of the unauthorized access instruction when the unauthorized access instruction is detected.

8. The unauthorized access detection method according to claim 6, further comprising notifying a predetermined notification party of the detection of the unauthorized access instruction when the unauthorized access instruction is detected.

9. The unauthorized access detection method according to claim 6, further comprising updating a management table that includes information related to an unauthorized access terminal that is a sender of an unauthorized access instruction as an unauthorized access originator when the unauthorized access instruction is detected.

10. The unauthorized access detection method according to claim 6, wherein the data is accessed on a file basis.

11. A non-transitory computer-readable medium storing an unauthorized access detection program, when executed on a storage system that manages an access from a terminal via a network to a storage apparatus, makes the storage system to execute:
sending an access instruction to the storage apparatus in response to the storage system being accessed by the terminal;
sending, in response to receiving the access instruction, a confirmation notification including sender information relating to a sender of the received access instruction;
determining, on the basis of the confirmation notification, whether or not the sender of the access instruction related to that confirmation notification is a processor of the storage system; and
determining, on the basis of determination result, the access instruction received from a sender other than the processor as an unauthorized access instruction, wherein the determining whether or not the sender of the access instruction related to that confirmation notification is the processor comprises determining that the sender of the access instruction related to a confirmation notification is the processor when the sender information included in the confirmation notification coincides with an identification provided by the processor for its own access instruction.

12. The non-transitory computer-readable medium according to claim 11, wherein the program makes the storage system to execute blocking an access from an unauthorized access terminal that is the sender of the unauthorized access instruction when the unauthorized access instruction is detected.

13. The non-transitory computer-readable medium according to claim 11, wherein the program makes the storage system to execute notifying a predetermined notification party of the detection of the unauthorized access instruction when the unauthorized access instruction is detected.

14. The non-transitory computer-readable medium according to claim 11, wherein the program makes the storage system to execute updating a management table that includes information related to an unauthorized access terminal that is a sender of an unauthorized access instruction as an unauthorized access originator when the unauthorized access instruction is detected.

15. The non-transitory computer-readable medium according to claim 11 wherein the data is accessed on a file basis.

16. A storage system that manages an access from a terminal via a network to a storage apparatus, the storage system comprising: a memory; and a processor to: send an access instruction to the storage apparatus in response to the storage system being accessed by the terminal;
send, in response to receiving the access instruction, a confirmation notification including sender information relating to a sender of the received access instruction;
determine, on the basis of the confirmation notification, whether or not the sender of the access instruction related to that confirmation notification is the processor; and determine, on the basis of determination result, the access instruction received from a sender other than the processor as an unauthorized access instruction, wherein the determining whether or not the sender of the access instruction related to that confirmation notification is the processor comprises determining that the sender of the access instruction related to a confirmation notification is the processor when the sender information included in the confirmation notification coincides with an identification provided by the processor for its own access instruction.

\* \* \* \* \*